UNITED STATES PATENT OFFICE.

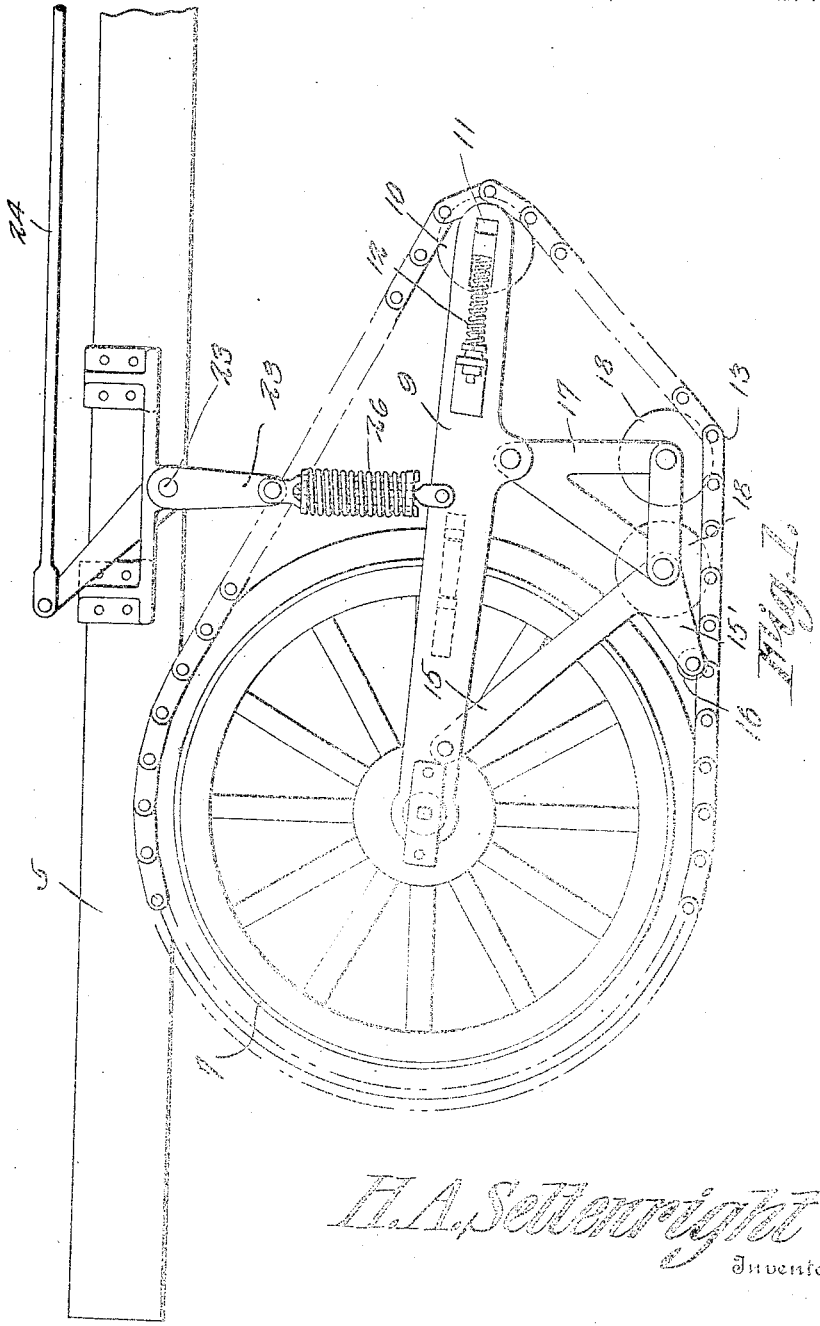

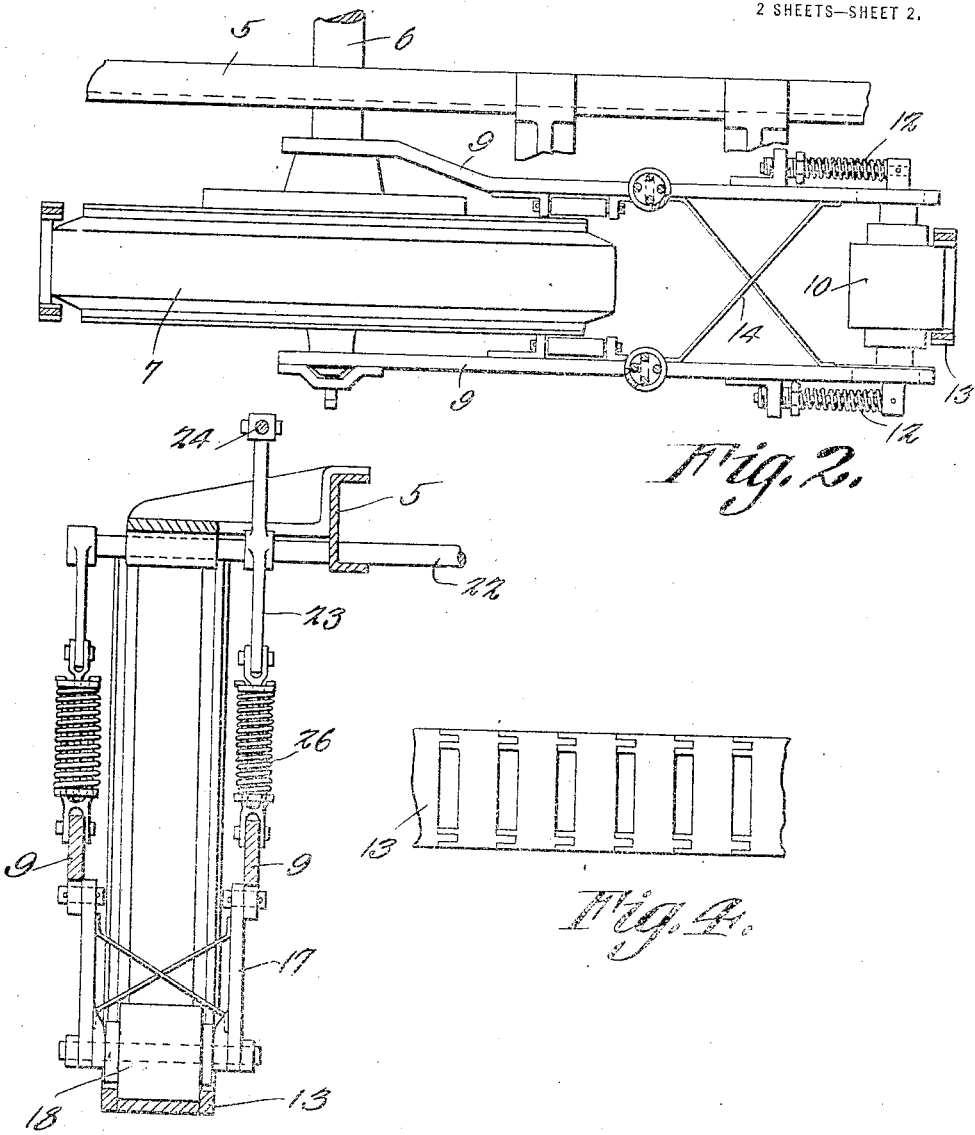

HARRY A. SELTENRIGHT, OF TOLEDO, OHIO.

PROPELLING ATTACHMENT FOR TRACTORS.

1,354,219.

Specification of Letters Patent. Patented Sept. 28, 1920.

Application filed May 19, 1919. Serial No. 298,122.

*To all whom it may concern:*

Be it known that I, HARRY A. SELTENRIGHT, a citizen of the United States, residing at Toledo, in the county of Lucas and State of Ohio, have invented a new and useful Propelling Attachment for Tractors, of which the following is a specification.

The present invention relates to driving attachments for farm tractors or heavy automobile trucks, the object being to provide a driving or propelling mechanism which will effectively drive a heavy tractor or truck over a slippery or soft road or may be used to propel the machine upon the ordinary roadway.

A second object of the invention is to provide a propelling mechanism which may be used in conjunction with and attached to any type of tractor or automobile without altering the parts of the same.

Another object of the invention is to provide a driving mechanism which may be readily applied to the axle and drive wheels of the tractor and which may be readily disassembled therefrom.

It is another object of the present invention to provide an attachment for driving tractors and the like which possesses the above characteristics and which is simple in construction, consists of few parts, and which may be manufactured and sold at a minimum cost.

With the above and other objects and advantages in mind the invention consists of novel combinations of elements, arrangements of parts, specific details and general assemblage which will be hereinafter fully set forth and illustrated in the accompanying drawing, and recited in the appended claims, the preferred form of the invention being illustrated in the accompanying drawings, wherein:—

Figure 1 is a side elevation of a tractor embodying my improved drive;

Fig. 2 is a top elevation of the same;

Fig. 3 is a front elevation of the drive; and

Fig. 4 is an elevation of part of the endless track used in connection with the invention.

Referring to the drawings in detail, wherein like characters of reference designate like parts in all of the views, the numeral 5 designates a tractor or automobile of any preferred type and includes the rear axle 6 and driving wheels 7.

The driving attachment consists of two pairs of hanger arms 9 which are arranged upon each end of the axle and upon opposite sides of the wheels 7. Mounted between the free ends of each pair of the hanger arms 9 and longitudinally slidable therein is a roller 10 having the ends of the shaft upon which it is mounted disposed in slots 11 in the ends of these hanger arms. This roller 10 is normally urged forwardly by expansible coil springs 12 which bear against the ends of the shaft.

Engaged about the periphery of the tractor wheels 7 are endless chains or tracks 13 which pass over the rollers 10.

Each pair of the arms 9 is connected together by braces 14 and depending from these hanger arms adjacent their attached ends is a pair of angularly disposed supporting bars 15 which have extensions 15′ formed at their lower ends in which are mounted guide rollers 16. Depending from each of the arms 9 is an inverted V-shaped bracket 17 which have their ends secured to the extensions 15′ and support rollers 18 which bear upon the trackway and hold the same in position to contact and grip the roadway.

A horizontal shaft 22 is journaled transversely through the chassis of the tractor. An angle lever 23 is secured to this shaft to one side of each wheel 7, one arm of each lever having operative connection with an operating rod 24 which in turn is pivoted to a hand lever not shown, by means of which the hangers may be swung upwardly to disengage the horizontal portion of the track from the roadway. The other arm of each of said levers 23 is pivotally connected with an expansible coil spring 26 which is connected with one arm of each pair of hangers 9 and consequently normally urges the arms downwardly and retains the rollers in engagement with the track and also retains the latter in engagement with the roadway. An arm is also secured to each end of the shaft and is connected with the outer hanger arms 9 by springs 26.

This embodiment of the invention is considered to be the preferred construction but it is to be understood that the same may be modified in many respects, and that my limits of modification are only governed by what is claimed.

What is claimed is:—

1. The combination with a self-propel vehicle, of pairs of hanger arms mountupon the rear axle of the same, a shaft mounted in each pair of hanger arms capable of longitudinal movement therein, a roller rotatable upon each of the shafts, expansible coil springs urging the rollers forwardly, tracks engaged about the drive wheels of the vehicle and passing over the rollers, supporting bars depending from the hanger arms, rollers carried thereby and bearing against the tracks to retain the same in a plane parallel to the roadway, brackets depending from the hanger arms and connected with one end of each of the supporting bars, and means for raising and lowering the hanger arms.

2. The combination with a motor vehicle, of hangers carried by the axle thereof, a shaft mounted in the hangers, a roller revoluble upon the shaft, a spring for urging the roller forwardly, a track engaged about one of the wheels of the vehicle and passing over the roller, a supporting bar depending from the hangers, a roller carried thereby and bearing against the track to maintain the same in a plane parallel with the roadway, a bracket depending from the hangers and connected to each of the supporting bars, and means for raising the hangers.

In testimony that I claim the foregoing as my own, I have hereto affixed my signature in the presence of two witnesses.

HARRY A. SELTENRIGHT.

Witnesses:
H. L. GEDDES,
E. H. SPOONER.